May 7, 1963 ZENZABURO TSUKUMO ETAL 3,088,267
AUTOMATIC DOFFER CONVEYING MECHANISM
Filed Oct. 31, 1961 7 Sheets-Sheet 1

Z. TSUKUMO,
S. IZUTSU, AND
T. SATO
Inventors

By Wenderoth, Lind and Ponack
Attorneys

May 7, 1963 ZENZABURO TSUKUMO ETAL 3,088,267
AUTOMATIC DOFFER CONVEYING MECHANISM
Filed Oct. 31, 1961 7 Sheets-Sheet 2

Z. TSUKUMO,
S. IZUTSU, AND
T. SATO
Inventors

By Wenderoth, Lind & Ponack
Attorneys

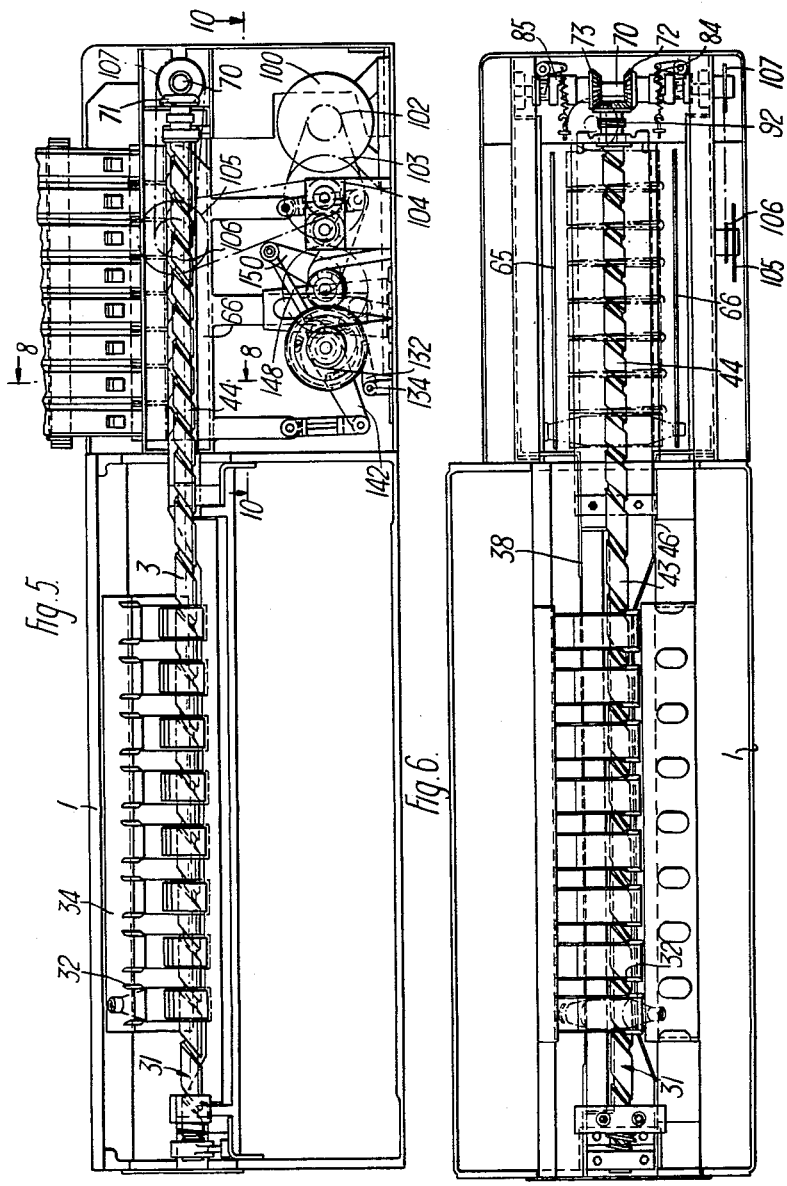

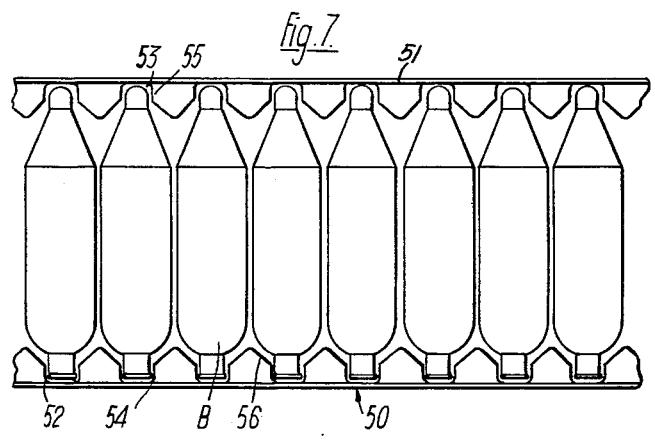
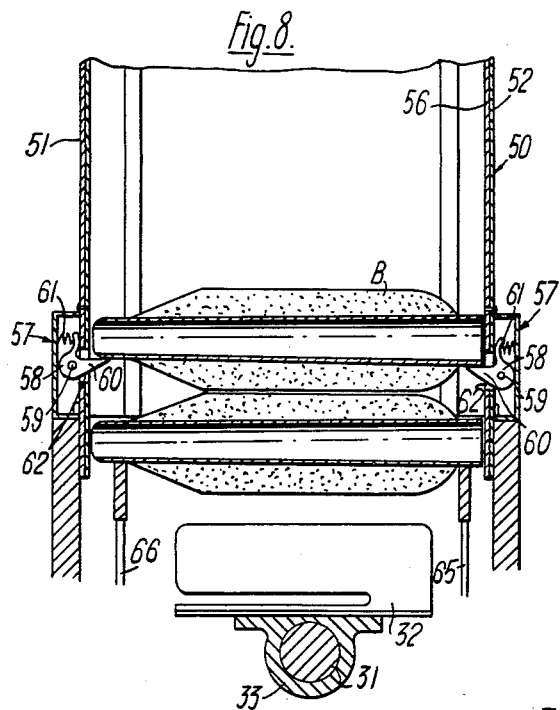

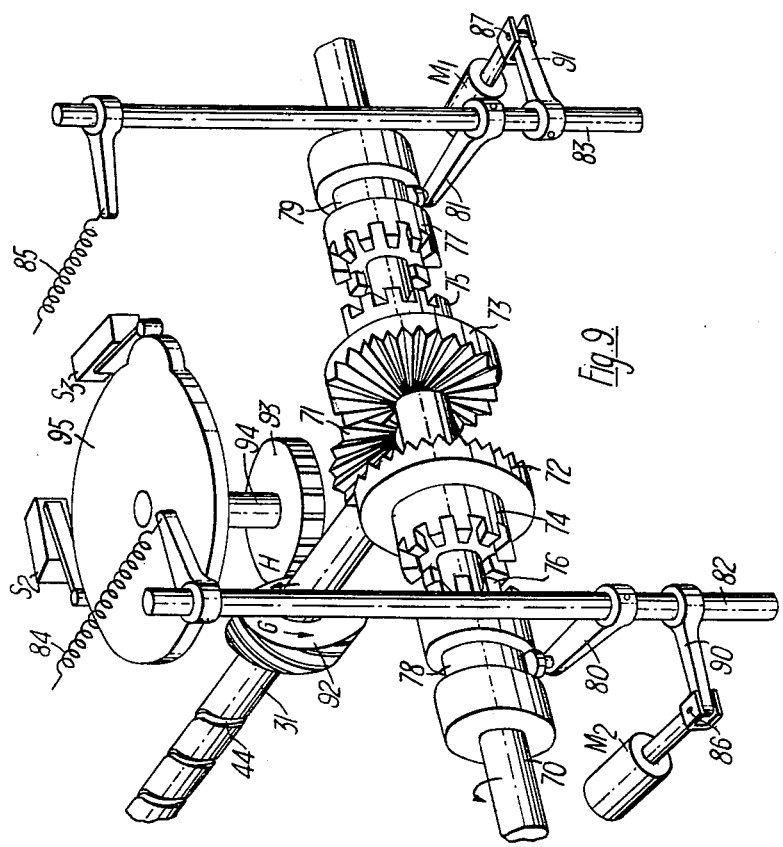

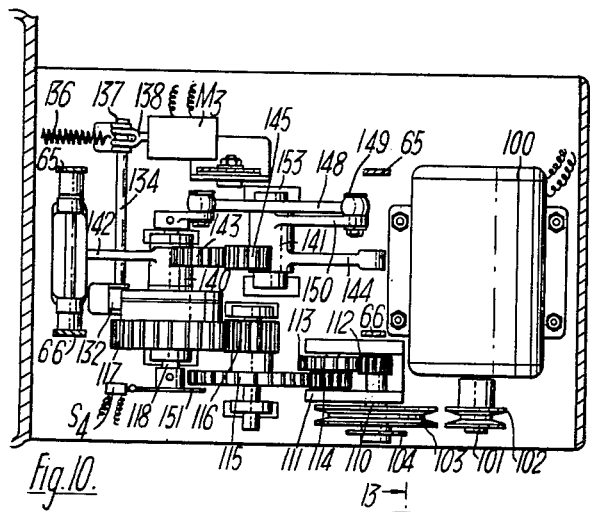
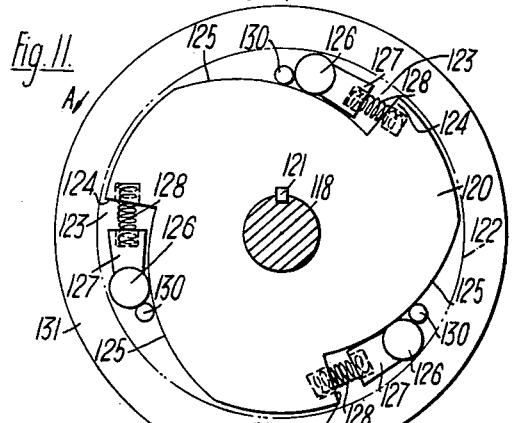
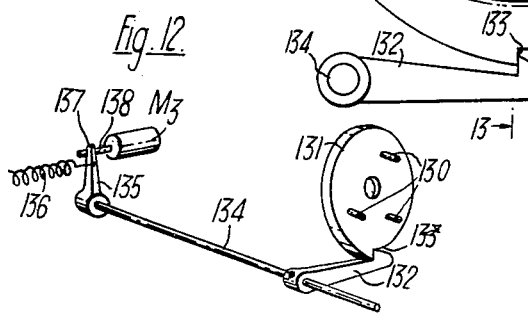

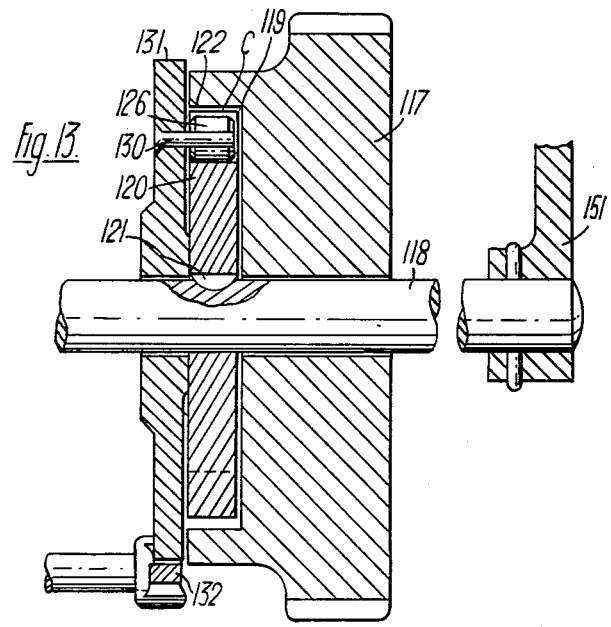
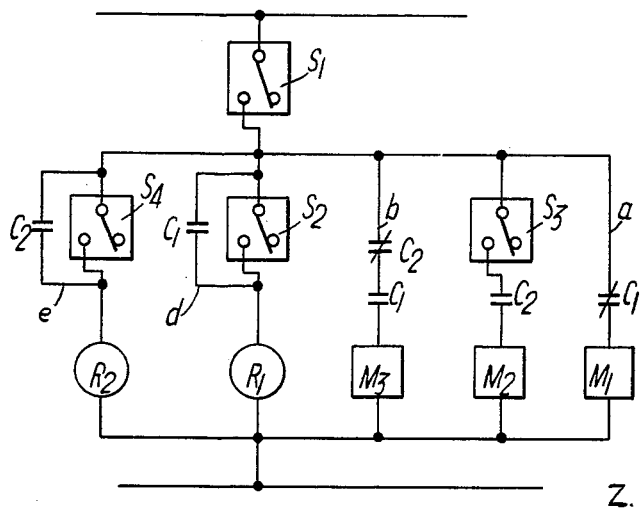
Z. TSUKUMO,
S. IZUTSU, AND
T. SATO
Inventors

United States Patent Office 3,088,267
Patented May 7, 1963

3,088,267
AUTOMATIC DOFFER CONVEYING MECHANISM
Zenzaburo Tsukumo, Nishinomiya, Seiji Izutsu, Showa-ku, Nagoya, and Takeki Sato, Nishifutamicho, Akashi, Japan, assignors to Toyo Boseki Kabushiki Kaisha, Kita-ku, Osaka, Japan, and Howa Kogyo Kabushiki Kaisha, Nakamura-ku, Nagoya, Japan
Filed Oct. 31, 1961, Ser. No. 149,126
6 Claims. (Cl. 57—53)

The present invention relates to apparatus for dealing with or arranging doffed full bobbins in side-by-side and stacked up relation in a magazine associated with an automatic doffer. The device of the present invention is usually incorporated into or associated with the so-called "auto-doffer" or automatic doffer for use in connection with ring frames, spinning, doubling, twisting and the like frames, which are generally referred to as ring frames herein.

There have been heretofore proposed various automatic doffers. Among these automatic doffers, there are the following types: removing all the full bobbins from all the spindles at a time; removing the full bobbins one by one; and removing bobbins group by group (usually from eight to ten in each group). A typical automatic doffer may be seen in U.S. Patent No. 2,653,440 (British Patent No. 699,902) which is of the type removing full bobbins group by group.

However, any of these known automatic doffers has no doffed full bobbin-arranging system, and it has been conventional that doffed full bobbins are thrown into and disorderly or randomly received by a bobbin container or box attached to such automatic doffer. When the doffed full bobbins are randomly discharged into such container, the container of a given size will be able to accommodate only a small number of bobbins as compared with the case where the bobbins are received by the container in close side-by-side and regularly stacked up or superposed relation, and consequently it is required to provide a larger container which is costful, inconvenient in handling and occupies undue space. Furthermore, such random discharge of the full bobbins apparently causes troubles in subsequent bobbin handling operations.

According to the present invention, these drawbacks can be completely eliminated by a novel system wherein doffed full bobbins in groups are received through chutes into their respective and individual receivers or carriers which are then conveyed toward and below an upright magazine, whereupon the bobbins are pushed upward and transferred into the magazine in side-by-side and stacked up relation.

Thus, an object of the present invention is to provide a bobbin-arranging apparatus which allows to accommodate as many doffed full bobbins as possible into an upright magazine in side-by-side and stacked up relation.

Another object of the present invention is to provide a doffed full bobbin conveyor system wherein a predetermined number of top-opened carriers or receivers are mounted traversably on a screw shaft which has two differently pitched portions, namely, one having a coarse pitch and the other a fine pitch, and the receivers in bobbin receiving position rest on the coarsely pitched shaft portion, with each receiver aligned with the corresponding spindle, and upon rotation of the screw shaft these receivers are moved toward the finely pitched shaft portion on which the distance between adjacent receivers is decreased so that the bobbins may be properly received in close side-by-side relation by the magazine arranged above the finely pitched shaft portion.

Another object of the present invention is to provide means to force or push full bobbins in their respective carriers or receivers into the upright magazine in side-by-side and stacked up relation.

Another object is to increase the bobbin-accommodating capacity of magazine of a given size.

These and other objects and features of the present invention will become apparent from the following description taken in connection with the accompanying drawings showing an embodiment of the present invention in which:

FIG. 3 is a schematic perspective view of conveyor means for conveying receivers with full bobbins therein toward and below a magazine into which the bobbins are to be accommodated;

FIG. 4 is an enlarged view showing one of the receivers in the bobbin receiving position;

FIG. 5 is a schematic front elevation showing screw conveyor means and bobbin-lifting means which are provided in a lower housing of the automatic doffer of FIG. 1;

FIG. 6 is a top plan view of FIG. 5;

FIG. 7 is an enlarged cross section taken along the line 7—7 of FIG. 1 and showing the arrangement of doffed full bobbins in the magazine;

FIG. 8 is an enlarged sectional view taken along the line 8—8 of FIG. 5 and showing the state in which the bobbin receivers have been moved below the magazine and the bobbins are being pushed upwardly into the magazine;

FIG. 9 is a schematic illustration showing the driving mechanism for the screw shaft;

FIG. 10 is a plan view of the mechanism for driving bobbin-lifting means as seen in the direction of line 10—10 of FIG. 5;

FIG. 11 is a face view of a friction type clutch with some parts removed, said clutch being employed in the mechanism shown in FIG. 10;

FIG. 12 is a schematic illustration showing means for engaging and disengaging said clutch;

FIG. 13 is a cross section taken along the line 13—13 of FIG. 11; and

FIG. 14 is a diagram illustrating the electrical circuit for automatically controlling the operation of the bobbin-arranging device of the present invention.

Figure 1:
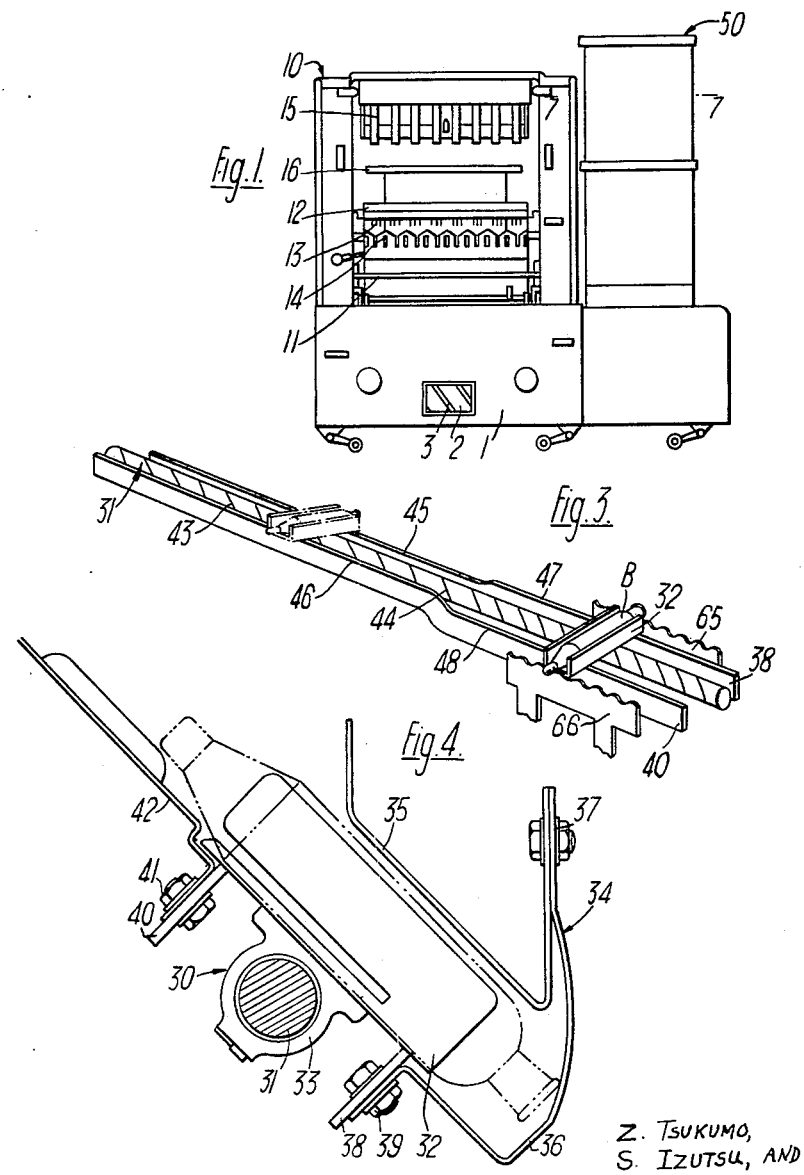
FIG. 1 is a schematic front elevation of an automatic doffer with which the present invention is associated.

Referring to the drawings, particularly to FIG. 1, on a housing 1 is mounted automatic doffing means 10 which is adapted to doff full bobbins group by group. The automatic doffer 10 with which a bobbin arranging apparatus of the present invention is associated may be of a conventional type well known in the art, and a detailed description thereof is considered unnecessary except for the following brief explanation.

In the embodiment shown, the automatic doffer 10 comprises various doffer components; such as means 11 for releasing full bobbins from their tight fit with spindles S, means 12 for pushing yarns aside to prevent the hindrance of yarns in doffing motions, means 13 for gripping and pulling out full bobbins from the spindles, yarn-cutting means 14, empty-bobbin supplying means 15, and means 16 for pressing the supplied empty bobbins onto the spindles to ensure a suitable tight fit of the bobbins with the respective spindles. A driving drum 2 partly housed in the housing 1 is provided with a groove 3 which engages a number of stationary pins 4 (FIG. 2) provided along the longitudinal length of a ring frame at fixed intervals so as to impart the apparatus a step-by-step movement along the front of the frame.

An automatic doffing means with which the apparatus of this invention is to be associated may be of any type so far as it is adapted to doff full bobbins group by group.

On the housing 1 is removably mounted a novel magazine 50 which constitutes a part of the present invention and into which doffed full bobbins are to be collected as fully described hereinafter.

Figure 2:
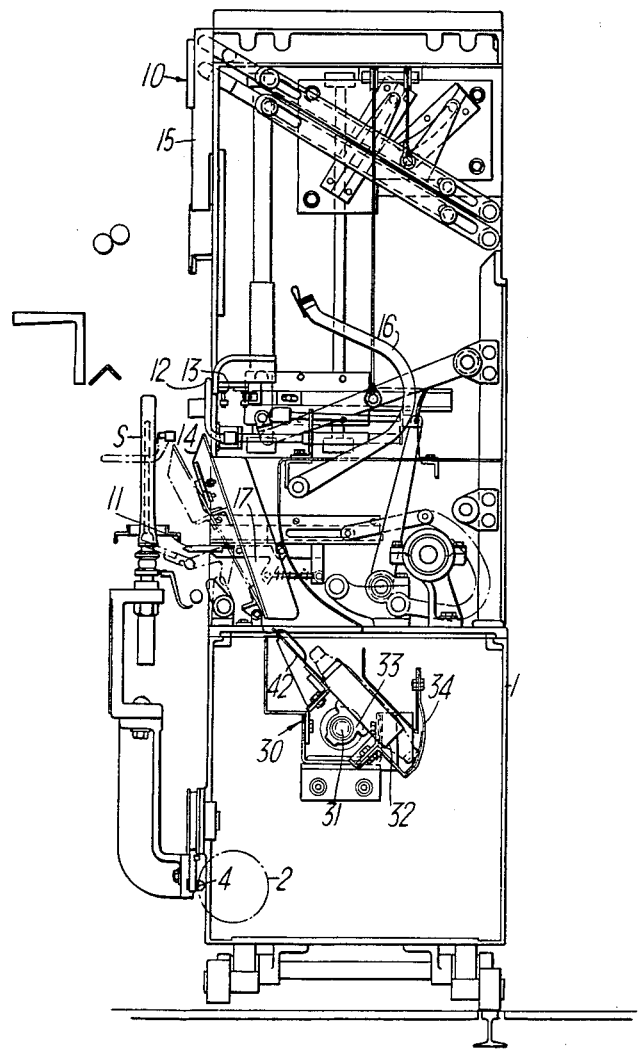
FIG. 2 is a cross sectional view showing the main structural components of the automatic doffer of FIG. 1.

Within the housing 1 is provided a doffed full bobbin conveyor system generally indicated at 30 in FIGS. 2, 3 and 4. The conveyor system 30 comprises a screw shaft 31 on which are traversably mounted a predetermined number of substantially U-shaped (with its top opened) separate carriers or receivers 32 by means of their bosses 33 each having a projection (not shown) engaged with the screw groove on the shaft 31 so that the receivers can move along the shaft 31 upon rotation of the latter. The shaft 31 is arranged to extend in parallel to the length of the ring frame. The number of the receivers 32 corresponds to the number of full bobbins to be doffed in groups at a time, and in this embodiment eight carriers or receivers 32 are provided. Each of the carriers or receivers is so dimensioned that the both ends of a bobbin when received in the carrier project beyond the ends of the carrier as well shown in the drawings.

As best seen in FIG. 4, the receivers or carriers 32 are partly surrounded by a guide or support assembly 34 consisting of an upper and bottom members 35 and 36 which are joined at 37 by bolt and nut means. The assembly 34 is connected to and supported by a stationary plate cam 38 at 39 by bolt and nut means. Connected at 41 to a second stationary plate cam 40 is a guide member 42 which cooperates with chutes 17 (FIG. 2) provided in the automatc doffer 10 so as to guide full bobbins, which have been doffed from the spindles by automatic doffer 10, into respective, individual carriers 32. Said guide assembly 34 serves to hold full bobbins, which are received in the carriers as shown in imaginary line in FIG. 4, in position. The purpose of the provision of the plate cams 38 and 40 will be fully described hereinafter. As well shown in FIG. 3 the screw shaft 31 extends between and along the cam plates 38 and 40.

Referring to FIGS. 3, 5 and 6, the screw shaft 31 has two differently pitched portions 43 and 44, the former having a coarsely pitched screw groove and the latter having a finely pitched screw groove.

The carriers or receivers 32 in bobbin receiving position are on the coarsely pitched screw shaft portion 43, with each receiver aligned with the corresponding spindle on the ring frame, and are held inclined as shown (in imaginary line, FIG. 3) by means of said two elongated plate cams 38 and 40 on which the receivers 32 seat, so as to facilitate the discharge and insertion of the doffed full bobbins into the respective receivers or carriers 32.

When the carriers 32 are moved to and on the finely pitched shaft portion 44 by the rotation of the screw shaft 33 in one direction, the inclination of the carriers is corrected and the carriers 32 are brought to a horizontal position (as shown in solid line, FIG. 3) by means of the plate cams 38 and 40. For this purpose the stationary plate cams 38 and 40, as schematically illustrated in FIG. 3, are formed with a lowered cam face 45 and a raised cam face 46 opposing to each other, respectively, along the coarsely pitched shaft portion 43. The cam faces 45 and 46 are terminated to their respective equally leveled faces 47 and 48 (formed along the finely pitched shaft portion 44) where as described hereinabove the carriers 32 are brought to horizontal and the full bobbins B carried by the same are forced upward and transferred into the magazine 50 by lifting arms 65 and 66 as shown in FIGS. 3 and 8, which lifting and transferring operation will be fully described hereinafter. The support assembly 34 and guide member 42 only extend substantially along the coarsely pitched shaft portion 43 (FIG. 5).

Referring to FIGS. 7 and 8, the construction of the magazine 50 will now be described. The magazine 50 is detachably mounted on the lower housing. As seen in FIG. 7, the magazine 50 has a pair of spaced upright side walls 51 and 52 provided internally with a number of vertical grooves 53 and 54 so as to receive the ends of doffed full bobbins B in side-by-side and stacked up relation. The grooves 53 and 54 are formed, for example, by suitably undulating thin plates 55 and 56, respectively, said undulated plates 55 and 56 being suitably welded, riveted or otherwise secured to the inner surfaces of the side walls 51 and 52, respectively. As seen in FIG. 8, the magazine 50 is provided at its lower end portion with detent means 57 for holding full bobbins B which have been pushed up past through the detent means by the lifting arms 65 and 66. Each detent means 57 comprises a pawl 58 pivoted at 59. The pawl 58 is so urged inwardly by a compression spring 61 that a hook portion 60 of the pawl is projected through an opening 62 formed in the side wall so as to engage the bottom of bobbin end and hold the same in position. It will be understood that each side wall is provided with such detent means in a number corresponding to the number of the bobbins to be pushed into the magazine at a time.

In FIG. 9 there is schematically illustrated a mechanism for driving the screw shaft 31 to move the carriers 32. The mechanism comprises a main driving shaft 70 having two opposed bevel gears 72 and 73 loosely mounted thereon and meshed with a bevel gear 71 rigidly secured on the screw shaft 31. The gears 72 and 73 have respective clutch portions 74 and 75 respectively engageable with clutch members 76 and 77 which are mounted on the driving shaft 70 in such a way that they are axially slidable as well as rotatable together with the shaft 70 by means of sliding key (not shown). The clutch members 76 and 77 are respectively provided with peripheral grooves 78 and 79 engaged with shift levers 80 and 81 respectively secured on pivotal shafts 82 and 83. The shift levers 80 and 81 are biased by respective tension springs 84 and 85 so that the clutch members 76 and 77 are normally kept disengaged from the clutches 74 and 75 as shown in FIG. 9. Arms 90 and 91 are secured respectively on the pivotal shafts 82 and 83 and are connected at 86 and 87 respectively to attraction bars 88 and 91 associated with respective electromagnets $M_2$ and $M_1$ for effecting the engagement of the clutches against the springs 84 and 85. Secured on the screw shaft 31 is a worm 92 meshing with a worm wheel 93 secured on one end of a shaft 94 having at the other end a timing cam 95 secured thereon and adapted to actuate microswitches $S_2$ and $S_3$ associated therewith. The purpose of the provision of such microswitches will be described hereinafter.

The main shaft 70 is constantly driven from a motor 100 (FIGS. 5 and 10) through pulleys 102 and 103 (with a belt) and sprocket wheels 104, 105, 106 and 107 (with respective chains). Thus, the pulley 102 is secured on the motor shaft 101; pulley 103 and sprocket wheel 104 are secured on a shaft 110 supported by a bracket 111; the sprocket wheels 105 and 106 (FIG. 5) are secured on a suitable supported counter shaft (not shown); and the sprocket wheel 107 is secured on the shaft 70. Such pulleys and sprocket wheels constitute speed reduction means.

Now, the mechanism for lifting full bobbins and transferring them into the magazine 50 will be described in reference to FIGS. 5, 10, 11, 12 and 13. Referring particularly to FIG. 10, the shaft 110 which is driven, as described just above, from the motor 100 has a driving gear 112 secured thereon. The rotation of the driving gear 112 is transmitted to a clutch gear 117 through speed reduction gears 113, 114, 115 and 116, said gear 117 being loosely mounted on a shaft 118.

As shown in FIG. 13, the clutch gear 117 is formed with a recess 119 in which is inserted a clutch disk 120 secured on the shaft 118 by means of a key 121. The outer periphery of the clutch disk 120 is surrounded by the peripheral inner wall 122 of the recess 119 with a clearance $c$ therebetween. Therefore, in normal state there is no frictional or driving engagement between the clutch gear 117 and the clutch disk 120.

As shown in FIG. 11, the clutch disk 120 is undercut at its periphery to form somewhat distorted triangular spaces 123 each defined by the inner peripheral wall 122, radial wall 124 and convoluted bottom wall 125. In order to establish the frictional or driving engagement between the clutch gear 117 and the clutch disk 120, there are inserted within the spaces 123 contact rollers or pins 126 and retainers 127 associated therewith. The rollers 126 and retainers 127 are urged toward stop pins 130 by compression springs 128 inserted between the retainers and the radial walls 124. The stop pins 130 are secured on a locking plate 131 loosely mounted on the shaft 118 and extend therefrom into the spaces 123 as well shown in FIG. 13. The locking plate 131 is retained in position shown in FIGS. 11 and 12 against the counter-clockwise torque produced by the force of the compression springs 128 by means of a ratchet 132 engaging the plate 131 at 133.

As schematically shown in FIG. 12 the ratchet 132 is secured on one end of a rod 134 having at its other end a lever 135 secured thereon. The lever 135 is biased by a tension spring 136 so as to cause the ratchet 132 to normally engage the plate 131 and is pivotally connected at 137 to the attraction bar 138 of an electromagnet $M_3$ which is employed to release the plate 131 from the ratchet 132.

The clutch gear 117 is constantly rotated in the direction of arrow A (FIG. 11), and therefore it will be understood that, when the locking plate 131 is released from the ratchet 132 by energizing the electromagnet $M_3$ (FIG. 12), the compression springs 128 force the contact rollers 126 to move into the narrower space portions of the distorted triangular spaces 123 whereby powerful driving engagement between the clutch gear 117 and the clutch disk 120 is established so that the disk is rotated in the direction of arrow A together with the locking plate 131. Upon the completion of one revolution of the clutch disk 120 (hence the shaft 118), the ratchet 132 is so actuated by deenergizing the magnet $M_3$ as to engage the locking plate 131 at 133 to stop the same so that the rollers 126 which have served as the driving engagement media are also stopped by the stop pins 130 which have been just stopped, while the clutch disk 120 still tends to continue to rotate by inertia, with the result that the rollers 126 reassume the position shown in FIG. 11 and the driving engagement between the gear 117 and the disk 120 is released. Thus, it is possible to rotate the shaft 118 for a predetermined number of revolutions and then stop the same by simple operations of disengagement and engagement of the ratchet 132 from and with the locking plate 131.

Referring again to FIG. 10, levers 140 and 141 for lifting the hereinbefore-mentioned arms 65 and 66 (FIG. 8) are loosely mounted on said shaft 118 and a shaft 153, respectively. The lever 140 has an arm portion 142 for supporting the arms 65 and 66 and is provided with a sector gear 143 secured thereto. Similarly, the lever 141 has a first arm portion 144 for supporting the arms 65 and 66 in cooperation with said arm portion 142 and is further provided with a sector gear 145 secured thereto and meshing with said sector gear 143. The gear ratio between the sector gears 143 and 145 is selected one-to-one.

The intermittent rotational movement (one revolution) of the shaft 118 is converted into a limited angular swing motion which is to be transmitted to the levers 140 and 141 in such a way as follows.

Secured on the shaft 118 is a crank arm 146 pivotally connected at 147 to one end of a connecting rod 148 which, in turn, is pivotally connected at its other end 149 to a second arm portion 150 integrally formed on the lever 141. Thus, it will be understood that by suitably selecting the crank radius of the crank arm 146, the radius of the arm 150 and the length of the connecting rod 148, the desired amount of angular movement of the levers 140 and 141 for causing the lifting arms 65 and 66 to push full bobbins upwardly into the magazine 50 can be obtained from one revolution of the shaft 118.

In FIG. 14 there is schematically shown the electrical circuit for controlling the automatic operation of the above-described bobbin-arranging apparatus of the present invention. The symbols $R_1$ and $R_2$ represent electrical relays which electromagnetically function to close or open contacts $C_1$ and $C_2$ which are placed in the various lines of the circuit. Said contacts are each represented by a pair of short parallel lines illustrating a break or normally open circuit in its respective line. However, the contacts having a diagonal line shown therethrough, each illustrate a normally closed circuit in their respective line and when activated by a related relay, function to open or break the circuit.

In operation, when the automatic doffer 10 has removed a group of full bobbins from spindles and discharged them to the respective carriers 32, a main microswitch $S_1$ is caused to close by a main cam (not shown) operatively related to the automatic doffer. Upon the closing of the switch $S_1$, the electromagnet $M_1$ (see FIG. 9) is energized through normally closed contact $C_1$ placed in line $a$ and therefore the clutch 77 is shifted into engagement with the clutch 75 whereby the screw shaft 31 is rotated in the direction of arrow H so that the carriers 32 now positioned on the coarsely pitched shaft portion 43 are moved (with a distance between adjacent carriers decreased to make them close to each other) toward the finely pitched shaft portion 44 above which the magazine 50 is positioned. At the same time, the switch cam 95 (FIG. 9) is rotated and when all the carriers 32 have been brought to position on the finely pitched shaft portion 44 the microswitch $S_2$ is caused to close so that the relay $R_1$ is energized to operate contacts $C_1$ whereby $M_1$ is deenergized to disengage the clutches 75, 77 and to discontinue the rotation of the shaft 31, simultaneous with the energization of the electromagnet $M_3$ (FIGS. 12 and 14).

Upon such energization of $M_3$, the locking plate 131 is released from the ratchet 132 whereby the shaft 118 is given one revolution through the before-mentioned friction type clutch means so that the full bobbins in the carriers 32 now in the position on the finely pitched shaft portion 44 are lifted, pushed and transferred into the magazine 50 by means of the lifting arms 65 and 66 as shown in FIG. 8. Upon the completion of such transfer operation (hence the completion of one revolution of the shaft 118), a microswitch $S_4$ (FIG. 10) is caused to close by a lever 151 (FIGS. 10 and 13) secured on the shaft 118 whereby the relay $R_2$ is energized to operate the contacts $C_2$ so that $M_3$ is deenergized by the fact that the normally closed contact $C_2$ placed in line $b$ is now opened. Thus, the locking plate 131 is again engaged with the ratchet 132 so that as hereinbefore mentioned the contact rollers 126 (FIG. 11) are brought in nonoperative position and the shaft 118 is stopped after the completion of one revolution. By this time the microswitch $S_3$ (FIG. 9) which was initially opened has been closed because of the rotation of the cam 95 so that simultaneously with the above-mentioned deenergization of $M_3$ the electromagnet $M_2$ (FIGS. 9 and 14) is energized and therefore the clutch 76 is shifted into engagement with the clutch 74 to cause the shaft 31 to start rotation in the direction of arrow G thereby returning the now emptied carriers 32 to their original position or on the coarsely pitched shaft portion 43. At the same time, the cam 95 (FIG. 9) is again rotated but in the opposite direction until the carriers 32 completely assume their original position, whereupon $S_3$ is again opened and the clutches 74 and 76 are disengaged to stop the rotation of the shaft 31. The above-mentioned main switch cam is so designed as to re-open the microswitch $S_1$ upon the completion of all the above-mentioned cycle of operation whereby the relays $R_1$ and $R_2$ which have been kept energized by their self-hold contacts $C_1$ and $C_2$ respectively placed in lines $d$ and $e$ are now deenergized and all the contacts $C_1$ and $C_2$ assume their original position. Thus one cycle of operation has been completed, and when the automatic doffer 10 removes another group of full bobbins and discharges them into the carriers 32, the same cycle of operation is repeated.

It is to be noted that according to the present invention the magazine can be made of any desired height and is not required to have a large cross-sectional area which has been heretofore necessary for collecting a large number of doffed full bobbins (usually 200 bobbins) for lack of the provision of such bobbin-arranging device on the conventional automatic doffing system. Such reduced cross-sectional area of the magazine contributes, of course, to elimination of undue occupation of valuable floor space by automatic doffer, and to easy handling thereof.

It is also to be noted that according to the present invention the doffer full bobbins are neatly arranged within the magazine in close side-by-side and stacked up relation in sharp contrast to random collection of doffed bobbins in a container in the conventional auto-doffing system.

While the invention has been described and shown with respect to a particular embodiment, it should be understood that many changes and modifications in the details of construction and arrangement of parts may be made without departing from the spirit of the invention.

What we claim is:

1. An apparatus adapted to be associated with an automatic doffer and for dealing with full bobbins removed by the automatic doffer group by group from ring frames, which apparatus comprises means for receiving the doffed full bobbins in side-by-side relation and spaced from each other, means for conveying the thus received bobbins toward and below an upright magazine and for simultaneously moving the spaced bobbins closely adjacent each other, and means for lifting and transferring the group of closely adjacent bobbins into the magazine in side-by-side and stacked up relation.

2. An apparatus as claimed in claim 1, in which the means for receiving the bobbins comprises a predetermined number of individual top-opened carriers, and the conveying means comprises a screw shaft on and along which the said carriers are movable toward and below the magazine upon rotation of the screw shaft.

3. An apparatus as claimed in claim 2, in which the screw shaft comprises two differently pitched screw shaft portions, a coarsely pitched screw shaft portion positioned in the bobbin-receiving section of the apparatus and a finely pitched screw shaft portion positioned below the magazine, whereby the carriers are positioned initially on said coarsely pitched screw shaft portion for receiving the doffed full bobbins individually and, upon rotation of the screw shaft, are then moved toward the finely pitched screw shaft portion with the distance between adjacent carriers decreased to bring the bobbins closely adjacent each other.

4. An apparatus as claimed in claim 2 in which the carriers in the bobbin receiving position are inclined to facilitate the receipt of the bobbins and said conveying means comprises means for moving said bobbin carriers to the horizontal position when they are in the position below the magazine.

5. An apparatus as claimed in claim 2 in which each carrier is so constructed that both ends of the bobbin when received in said carrier project beyond the ends of the latter, and the bobbin lifting means has bobbin lifting members at each end of said carriers to engage and push the projected bobbin ends upwardly so as to transfer the bobbins into the magazine.

6. An apparatus as claimed in claim 1 further comprising a magazine removably mounted on the apparatus above said lifting means and comprising a pair of spaced upright side walls, each having a predetermined number of vertical grooves to receive the bobbin ends, each of said grooves having at its lower portion detent means for preventing the bobbins received in the magazine from falling by gravity.

References Cited in the file of this patent

UNITED STATES PATENTS

| | | |
|---|---|---|
| 1,078,553 | Peterson | Nov. 11, 1913 |
| 1,810,754 | Buddecke | June 16, 1931 |
| 2,254,291 | Joa | Sept. 2, 1941 |
| 2,858,010 | Adams | Oct. 28, 1958 |

FOREIGN PATENTS

| | | |
|---|---|---|
| 800,271 | Great Britain | Aug. 20, 1958 |